July 24, 1962 H. P. CAIN 3,046,037
COUPLING AND SUPPORTING MEANS FOR VEHICLES
Filed April 13, 1960

HOWARD P. CAIN
INVENTOR.

BY Robert A. Spray
ATTORNEY

United States Patent Office 3,046,037
Patented July 24, 1962

3,046,037
COUPLING AND SUPPORTING MEANS
FOR VEHICLES
Howard P. Cain, R.R. 1, Danville, Ind.
Filed Apr. 13, 1960, Ser. No. 21,990
3 Claims. (Cl. 280—477)

This invention relates a novel and advantageous coupling and supporting means, for conveniently coupling a wagon or the like to a drawing vehicle such as a tractor.

An object of my invention is to provide a novel coupling which will provide convenient, semi-automatic attachment of a drawn vehicle and a drawing vehicle.

A further object is to provide an economical coupling having guide means for guiding the mating parts thereof together, regardless of their initial relative location, whether they are too close together or too far apart, thus permitting convenience of coupling with relatively little pre-alignment of the parts.

A further object is to provide a coupling in which the tractor draw-bar of conventional tractors may be utilized without alteration, permitting a drawn vehicle adapted by my invention to be used with various types of drawing equipment, such as tractors, hay-balers, or the latter one of a tandem-arranged series of vehicles, such as a tractor, field-chopper and wagon, or a tractor, hay-baler and wagon.

A still further object is to provide a novel semi-automatic coupling which permits a user to either hitch or un-hitch the drawn and drawing vehicles while seated on the seat of the drawing tractor.

Another object is to provide a supporting means capable of supporting the forward end of the tongue of a drawn vehicle at a convenient height for coupling the tongue to the drawing tractor, yet which will not interfere with normal operation of the drawn vehicle, and which easily permits the tongue to be lowered below the coupling elevation if desired.

A further object of my invention is to provide a novel coupling means adapted for various types of drawn vehicles, such as wagons, discs, grain-drills, rotary hoes, ground-tillers, and the like.

A still further object is to provide a novel hitch giving particular advantages to a clevis-type tongue-hitch.

Another object is to provide a novel, convenient, and semi-automatic coupler which is economical to manufacture, easy to install on existing equipment, easy to maintain, and without complex or bulky construction.

In carrying out my invention in a preferred embodiment, with a wagon, for example, I provide a U-shaped bracket for mounting on the upper bar of the wagon-tongue clevis, the bracket arms being provided with openings aligned with the pin-holes of the tongue clevis. A hitch-pin is inserted downwardly through the upper bracket-arm, and a spring between the bracket-arms biases the pin downwardly, into hitching position.

The wagon-tongue, at a forward portion thereof and rearwardly adjacent the clevis, is provided with a supporting-leg of a length sufficient to support the tongue-clevis at the height of the tractor draw-bar. The supporting-leg is formed to have a stiff coil-spring as its upper portion, the spring being able to support compressive load adequately to support the wagon-tongue, but being resiliently deformable to permit the supporting-leg to be deflected harmlessly rearwardly during use upon engaging raised obstacles such as rocks.

The draw-bar of the tractor is provided with guide means having both a rearward and a forward flare with respect to the draw-bar pin-hole, the walls thereof thereby adapted to guide the hitch-pin into the draw-bar hole.

The description so far given, although introductory and rather general, indicates how the invention provides, economically and without bulky or complex components, a convenient coupling having many advantages of convenience; the foregoing and further and more particular objects, features, and advantages of the present invention will further appear from the following, more detailed description, reference being had to the accompanying drawings, in which.

Figure 1:
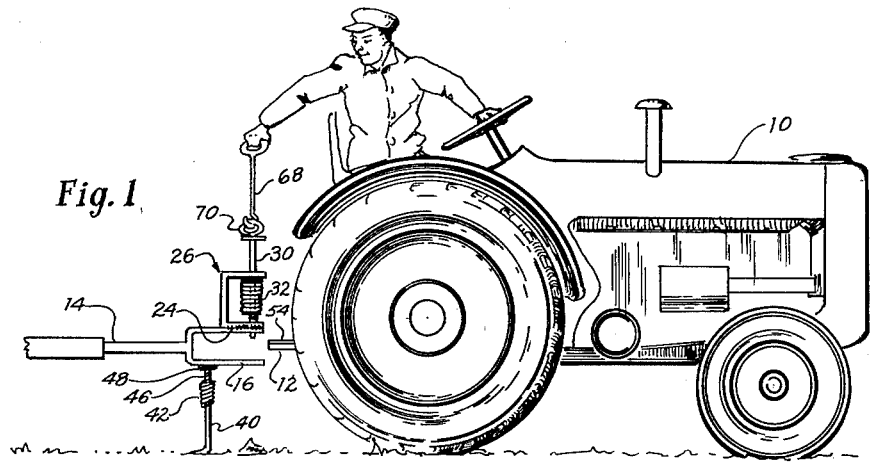
FIG. 1 is an elevational view of my invention, illustrating the tractor operator having manipulated the connecting pin to a withdrawn condition for attachment or detachment of a drawn vehicle from a driving tractor.
Figure 4:
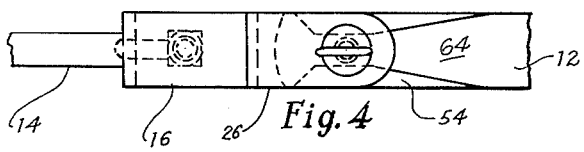
FIG. 4 is a plan view of the detail shown in FIG. 2.

In the embodiment illustrated in the drawings, my inventive concepts are shown in association with a tractor 10 having a draw-bar 12, and a drawn vehicle such as a wagon. The wagon has a pulling tongue 14 which carries a clevis bracket 16, the clevis bracket 16 having in its arms vertically-aligned openings 18, and the draw-bar 12 having an opening 20 for reception of a latch or connecting pin which interconnects the wagon and tractor.

In carrying out my invention, I secure to the clevis bracket 16, as by welds 24, a pin-bracket shown in the form of a generally C-shaped bracket 26 having, in its parallel arms, openings 28 vertically aligned with each other and with the openings 18 of the clevis bracket; and I provide an elongated pin such as king-pin 30 of a length to extend through all four of the openings, and through the opening 20 of the draw-bar 12, to provide the connecting pin for the vehicles.

Figure 2:
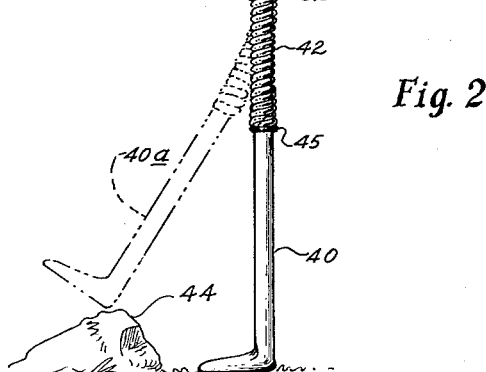
FIG. 2 is an enlarged detail view of the connection and supporting means of FIG. 1, the pin being shown in connecting position, and with portions of the components shown as broken away for clarity of presentation.

I provide means to urge the pin 30 into the vehicle-connecting position of FIG. 2, as shown by a coil spring 32 which is passed around the shank of pin 30 between the arms of the pin-bracket 26, the spring 32 bottoming against the outer one of such arms and bearing against an abutment on pin 30 conveniently provided by a washer 34 which is retained by a cotter-pin 36.

Another feature of my invention includes means for supporting the wagon in a "ready" condition (see FIG. 1), in which condition the wagon clevis 16 and the tractor draw-bar 12 conveniently will register. As shown, this wagon-tongue support is provided by an advantageous support-leg 40 provided near the front end of the tongue 14.

The leg 40 is shown formed partially of a heavy spring 42, which, although stiff enough to support the compressive load of the wagon-tongue, is resiliently deformable as indicated by the dashed-line position indicated by reference numeral 40a to readily clear any obstacle 44. A weld 45 is shown as connecting the spring 42 to the leg 40.

For connecting the leg 40 to the wagon-tongue, the leg 40 is shown as formed, upwardly of spring 42, of a threaded bolt 46 which is screwed into a nut 48 shown welded by weld 50 to the under-side of the wagon-tongue 14. The bolt 46 is welded as by weld 52, to the spring 42.

Figure 3:
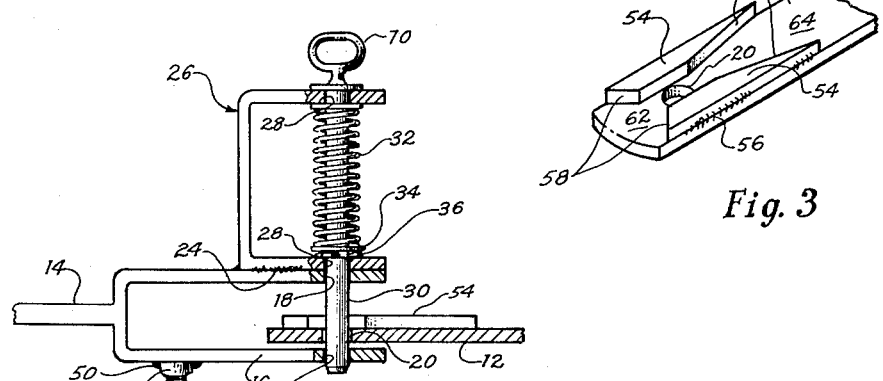
FIG. 3 is a further enlarged view of the rear portion of the tractor draw-bar.

Still further features of my invention are the means which are provided for assisting in the proper registry and alignment of the tractor draw-bar and the wagon-tongue clevis, for connection of the vehicles. Such guide means, as shown in FIG. 3, are economically provided by a pair of guide-abutments 54 secured as by welds 56 to the draw-bar 12; and the abutments 54 extend both forwardly and rearwardly of the draw-bar opening 20, flaring smoothly outwardly from the opening 20, to provide both rearwardly-facing guide walls 58 and forwardly-facing guide walls 60.

Accordingly, to effect a registry of the draw-bar 12 and wagon-tongue clevis 16 for coupling of the vehicles, the user needs to position the two components to a merely relatively inaccurate position in which the axis of pin 30 overlies any portion of either the rear draw-bar area 62 or front draw-bar area 64; then, a subsequent rearward or forward, respectively, movement of the tractor causes the guide wall 58 or 60 to guide the pin 30 to registry with draw-bar opening 20, whereupon the pin-spring 32 causes the pin 30 to snap into the draw-bar opening 20 to effect the desired coupling of the vehicles.

It is to be noted that the pin-bracket 26 is on the upper side of the wagon-tongue, and the head of king-pin 30 extends upwardly; thus the operator may effect the coupling or un-coupling while remaining seated on the tractor (see FIG. 1), by the economical provision of a control member such as a hook 68, which may be conveniently hooked through an eye 70 at the head end of pin 30 to effect a withdrawal of the pin 30 to its retracted position.

Thus it is seen that the various components and concepts of my overall invention all co-operate to provide an economical and advantageous coupling and supporting means, whereby the drawing and drawn vehicle may be conveniently coupled and uncoupled, without the provision of bulky and complex components, and by components which may be readily affixed to existing equipment.

Accordingly, it is seen from the foregoing description of my invention according to the illustrated embodiment, considered with the accompanying drawings, that my invention provides a new and useful device having many desired advantages and characteristics, and accomplishing its intended objects, including those hereinbefore pointed out and others which are inherent in the invention.

It will be understood that modifications and variations may be effected without departing from the scope of the novel concepts of the present invention; accordingly I wish it to be understood that my invention is not limited to the embodiment thereof illustrated and described.

I claim as my invention:

1. A coupling and supporting means for interconnecting support members of two vehicles and the like, comprising: a support leg extending from one of the support members for engaging the ground and thereby supporting said support member at an elevation operatively registering with the other of the said support members; the support members including a first support member and a second support member; retractable pin means carried by said first of said support members and pin-mating means carried by said second of said support members for interconnecting said two support members; the pin means being movably related to the said first support member and movable independently of said first support member; means biasing said pin means toward an extended position for said interconnecting of the two support members; the pin means being retractable to permit the two support members to be brought into operative registry of the pin means and the pin-mating means for coupling and to be moved away from operative registry for un-coupling; and guide means provided by the second of said support members for guiding the support members into registry by engaging said pin means; said guide means extending both rearwardly and forwardly from the location thereon of registry of the pin means permitting registering movement from either forwardly or rearwardly of the registry location of the pin means with the support member.

2. A coupling and supporting means for interconnecting support members of two vehicles and the like, comprising: a support leg extending along a generally vertical axis from one of the support members for engaging the ground and thereby supporting said support member at an elevation operatively registering with the other of the said support members; said support leg having a portion thereof formed wholly of a heavy helical spring stiff enough to support a compressive load exerted by said one support member, but resiliently deformable to permit the leg to be deflectable out of the said leg-axis over obstacles engaged during vehicle movement; and means for releasably interconnecting the two support members when they are brought into operative overlying registration at the said elevation of operative registration.

3. A coupling for interconnecting support members of two vehicles and the like, comprising: latch means extending from one of said support members and engageable with the other said support member to interconnect the two support members, guide means carried by said second support member for guiding said latch means relatively to the said other support member to effect a latching registry therewith; the guide means extending in a latch-means-guiding manner both forwardly and rearwardly of the location of latching registry, and leading toward said latching-registry-location from both rearward and forward positions with respect to said registry-location.

References Cited in the file of this patent

UNITED STATES PATENTS

| | | |
|---|---|---|
| 987,397 | Pittroff | Mar. 21, 1911 |
| 1,626,993 | Williams | May 3, 1927 |
| 2,478,736 | Balzer | Aug. 9, 1949 |
| 2,671,673 | Benson | Mar. 9, 1954 |
| 2,771,147 | Ash | Nov. 20, 1956 |
| 2,788,227 | Wallace | Apr. 9, 1957 |
| 2,844,390 | Smith | July 22, 1958 |
| 2,937,887 | Richman | May 24, 1960 |

FOREIGN PATENTS

| | | |
|---|---|---|
| 854,483 | Germany | Nov. 4, 1952 |